(12) United States Patent
Jaeger et al.

(10) Patent No.: US 10,183,703 B2
(45) Date of Patent: Jan. 22, 2019

(54) CONFORMABLE MUD FLAP

(71) Applicant: JAEGER BROTHERS AUTOMOTIVE ACCESSORIES, INC., Saline, MI (US)

(72) Inventors: Jason Jaeger, Saline, MI (US); Jonathan Jaeger, Saline, MI (US)

(73) Assignee: Jaeger Brothers Automotive Accessories, Inc., Saline, MI (US)

( * ) Notice: Subject to any disclaimer, the term of this patent is extended or adjusted under 35 U.S.C. 154(b) by 0 days.

(21) Appl. No.: 16/002,302

(22) Filed: Jun. 7, 2018

(65) Prior Publication Data

US 2018/0354561 A1    Dec. 13, 2018

Related U.S. Application Data

(60) Provisional application No. 62/517,844, filed on Jun. 9, 2017.

(51) Int. Cl.
*B62D 25/00* (2006.01)
*B62D 25/18* (2006.01)
*B62D 25/16* (2006.01)

(52) U.S. Cl.
CPC ......... *B62D 25/182* (2013.01); *B62D 25/161* (2013.01); *B62D 25/163* (2013.01)

(58) Field of Classification Search
None
See application file for complete search history.

(56) References Cited

U.S. PATENT DOCUMENTS

| | | | |
|---|---|---|---|
| 1,730,733 A | 10/1929 | Judd | |
| 2,782,053 A * | 2/1957 | Long | B62D 25/188 160/231.1 |
| 4,089,537 A | 5/1978 | Pralutsky | |
| 4,215,873 A | 8/1980 | Price | |
| 4,293,140 A | 10/1981 | Bell et al. | |
| 4,408,939 A | 10/1983 | Graff et al. | |
| 4,605,238 A | 8/1986 | Arenhold | |
| 4,660,846 A * | 4/1987 | Morin | B62D 25/188 280/851 |
| 4,724,585 A | 2/1988 | Whitman | |
| 5,044,667 A | 9/1991 | Manning | |
| 5,048,868 A | 9/1991 | Arenhold | |
| 5,833,349 A | 11/1998 | Apple | |
| 5,967,553 A | 10/1999 | Cominsky | |
| 5,987,821 A | 11/1999 | Heim et al. | |
| 6,193,278 B1 | 2/2001 | Ward | |
| 7,172,008 B2 | 2/2007 | Vanbenschoten | |
| 7,578,526 B2 * | 8/2009 | Jaeger | B60R 13/04 280/154 |
| 8,118,329 B2 * | 2/2012 | Braga | B62D 25/18 280/848 |
| 9,821,856 B1 * | 11/2017 | Caruso | B62D 25/188 |
| 2007/0128442 A1 | 6/2007 | Buehler | |

* cited by examiner

*Primary Examiner* — Paul N Dickson
*Assistant Examiner* — Hilary L Johns
(74) *Attorney, Agent, or Firm* — Mark Young, P.A.

(57) ABSTRACT

A mud flap assembly includes a flexible elongated spine to which protective scales are permanently or removable attached in a spaced apart array with an overlapping configuration. An attachment, such as an adhesive, magnets, or weatherstrip is fixed to the spine. The attachment secures the spine to a flange or edge of a fender of a vehicle.

20 Claims, 18 Drawing Sheets

CONFORMABLE MUD FLAP

RELATED APPLICATION

This application is a nonprovisional and claims the benefit of priority of U.S. Provisional Application 62/517,844 filed 9 Jun. 2017, the entire contents of which are incorporated herein.

FIELD OF THE INVENTION

This invention relates generally to motor vehicles, and, more particularly, to a debris guard for attachment to fenders of motor vehicles.

BACKGROUND

Mud flaps are well known in the art. While they generally protect a vehicle from damage due to debris thrown from wheels, conventional mud flaps suffer several shortcomings. First, installation typically entails drilling holes and clamping, bolting or screwing the mud flaps into place. Such processes may materially compromise the finish, corrosion resistance and resale value of a vehicle. A related problem is that removal can be tedious and often leaves bare metal exposed to the elements. Yet another problem with conventional mud flaps is that they are relatively rigid and do not accommodate a range of fender configurations and sizes. Thus, manufacturers and retailers must supply countless different versions.

U.S. Pat. No. 7,578,526 to Jaeger discloses a releasable pliant non-marring mud flap, which works very well. However, the panel and engagement channel of that mud flap, must be configured (i.e., sized and shaped) for a particular fender, i.e., for a particular vehicle. As there are countless vehicles, such mud flaps are typically produced for a limited range of vehicles. Otherwise production and inventory would be cost prohibitive.

In view of these shortcomings, many vehicle operators simply forgo mud flaps. This holds true particularly for classic car enthusiasts, who tend to condemn any aftermarket, non-original equipment. In such cases, road grime and flying gravel can wreak havoc on fine vehicle finishes, not to mention the finishes and windshields of vehicles following behind.

What is needed is a mud flap that can be easily installed and removed, without any damage to a vehicle, and that can conform to fit a wide range of vehicles.

The invention is directed to overcoming one or more of the problems and solving one or more of the needs as set forth above.

SUMMARY OF THE INVENTION

To solve one or more of the problems set forth above, in an exemplary implementation of the invention, a conformable mud flap includes a flexible elongated spine to which protective scales are attached in a spaced apart array, with an overlapping configuration, with overlapping portions of scales not being fixedly attached together. The spine is an elongated thin strip that is flexible in three dimensions. The strip may be comprised of rubber, plastic, a mixture of rubber and plastic, or malleable metal.

An attachment, such as an adhesive, magnets, or weatherstrip, is attached to the spine. The attachment secures the spine to a fender of a vehicle, such as to a flange or edge of a fender of a vehicle. The attachment may be an adhesive (e.g., a pressure sensitive adhesive), a U-shaped channel, a mechanical fastener or a magnet.

Each scale is a thin protective piece. Each piece may be cut or stamped from a sheet, or otherwise formed. Each scale overlaps an adjacent scale. Each scale extends outwardly from the spine at least 0.10 inches. The width of the scales is sufficient for the edges of immediately adjacent scales to overlap, even when the spine is bent to conform to a fender. The scales may be comprised of rubber, plastic, a mixture of rubber and plastic, composites, or a metal. In one particular embodiment, each scale extends outwardly from the spine at least 1.0 inch and has a maximum width of at least 0.5 inches. The scales may be permanently attached to the spine or removably attached, such as with snap fit joints. The scales may be plain or colorful, ornately decorated with graphics, images, textures and 3D features. The scales may have a generally triangular or quadrilateral shape, with rounded corners, or another shape such as oval, irregular, symmetric or non-symmetric.

The spine may be cut to length for a particular vehicle and a user's preferences.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

With reference to FIGS. 1-4, an exemplary conformable mud flap assembly 100 according to principles of the invention includes a flexible elongated spine 105 to which protective scales 125-175 are attached in a spaced apart array with an overlapping configuration, with overlapping portions of scales not being fixedly attached together. Each scale in the spaced apart array is attached to the spine at a point that is spaced apart from the point of attachment of an immediately adjacent scale. The distance between immediately adjacent scales in the spaced apart array may be, but does not have to be, equal.

An attachment (i.e., vehicle attachment) secures the spine to a portion of a vehicle, such as, but not limited to, to a fender of a vehicle. An attachment, such as a pressure sensitive adhesive, is attached to the spine. The attachment, which is discussed in greater detail below, secures the spine to a fender, particularly to a flange or edge of a fender, of a vehicle. The scales 125-175 may be removably attached to the spine or permanently attached, such as with adhesive, bonding agents or ultrasonic welding. The scales 125-175 may be plain or colorful, ornately decorated with graphics, images, textures and 2D and/or 3D features. The scales 125-175 may have a generally polygon (e.g., quadrilateral, parallelogram, rhombus) or irregular shape, with rounded corners, as depicted in the FIGS. 1-4, or another shape, such as triangular, teardrop, oval, irregular (e.g., character or logo shapes), symmetric or non-symmetric, with sharp or rounded corners and vertices, if any. The scales 125-175 should be sized to extend at least an inch, preferably more in height. The width of the scales 125-175 should be sufficient for the edges of immediately adjacent scales to overlap, even when the spine 105 is bent to conform to a fender. The spine 105 may be cut to length for a particular vehicle and a user's preferences.

Figure 1:
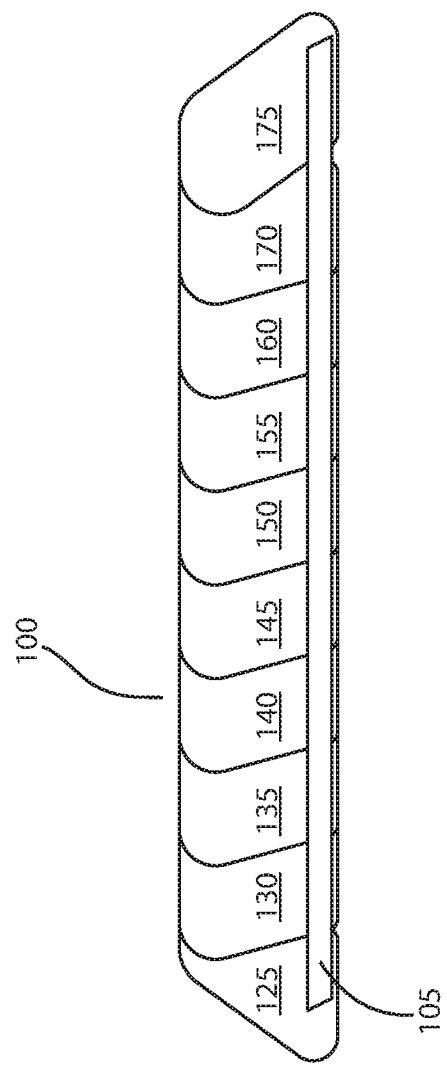
FIG. 1 is a first view of an exemplary conformable mud flap assembly according to principles of the invention.
Figure 2:
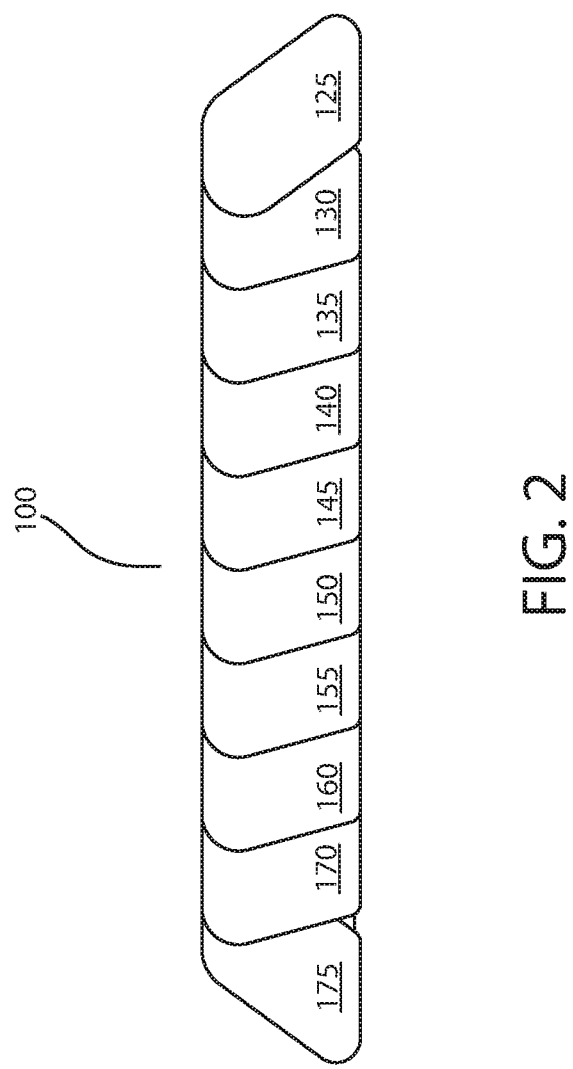
FIG. 2 is a second view of an exemplary conformable mud flap assembly according to principles of the invention.

With reference to FIG. 1, the scales 125-175 are sized to extend a sufficient distance from the spine 105 to protect a surface, which may be less than an inch, an inch, or more (e.g., about 1.25 to 4 inches) in height (i.e., length). The invention is not limited to scales of any particular height.

A user may trim scales to a desired size and shape. Scales comprised of thin plastic or rubber, may be cut to a desired size or shape with a knife, scissors or shears. Optionally, scales may include perforations and/or frangible scores to break off undesired portions by bending the portion back and forth along the perforation. As another option, scales may include printed or embossed guides (e.g., lines or grids) to facilitate consistent sizing and cutting.

The maximum width, measured from side edge to side edge, of the scales 125-175 should be sufficient for edges of immediately adjacent scales 125-175 to overlap, even when the spine 105 is bent to conform to a fender. Widths of at least about 0.75 to 2 inches work well. The scales 125-175 are spaced and used in numbers to provide such overlapping edges for the entire length of the mudflap assembly 100.

An assembly 100 according to principles of the invention includes sufficient scales to provide a barricade. The invention is not limited to any particular number of scales. The number will depend upon the size (length) of the assembly and the size of the scales. The length of the assembly 100 should be sufficient to extend along a substantial portion of the rear section of a fender flange or edge.

Scales 125-175 may be formed of any durable sheet-like material, such as metal and/or plastic. In an exemplary implementation, the scales 125-175 are comprised of a rigid rubber, plastic or polymeric material, such as polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters. While many other materials may be used alone or in combination with the aforementioned materials and/or other materials, without departing from the scope of the present invention, preferably the material is corrosion and weather resistant, impact resistant, durable, easy to clean, produces an aesthetically pleasing product and is relatively inexpensive and easy to manufacture. The material may further include additives to provide desired properties such as desired colors, structural characteristics, glow-in-the dark properties and thermal reactivity (e.g., color changes according to heat).

Optionally, by way of example and not limitation, the scales 125-175 may be formulated to change color when it reaches a predetermined or higher temperature. This can be accomplished by mixing a thermochromic additive to the material comprising the scales 125-175 in an amount that is sufficient to achieve a desired color changing range. As an example, a mixture of approximately 5% to 30% (pbw) of Matsui International Co., Inc.'s Chromicolor® concentrate may be introduced to the panel 320 material, to provide a plastic structure that visibly changes color at a determined elevated temperature, such as approximately 90 degrees Fahrenheit or higher.

Alternatively, a photochromic additive may optionally be added to the material in an amount that is effective to achieve a desired color change when the scales 125-175 are exposed to certain lighting conditions. As an example, a mixture of approximately 5% to 35% (pbw) of Matsui International Co., Inc.'s Photopia® additive may be introduced to the material, to provide a plastic structure that visibly changes color in the presence of sunlight or ultraviolet light.

As another alternative, phosphorescent polymer additives, such as aluminate based phosphors, may optionally be added to the material to adsorb light energy and continue to release that energy as visible light after the energy source is removed. Advantageously, such an embodiment provides scales 125-175 that are noticeable in darkened conditions, making the vehicle easy to spot even at nighttime.

As yet another example, the scales 125-175 may contain retroreflective particles such as glass beads, microprisms, or encapsulated lenses embedded in a transparent matrix. In such an embodiment, lights from headlights of approaching vehicles will reflect from the scales, thereby improving visibility. As yet another embodiment, retro-reflectors may be attached to the outer surface of one, some or all of the scales 125-175.

Figure 3:
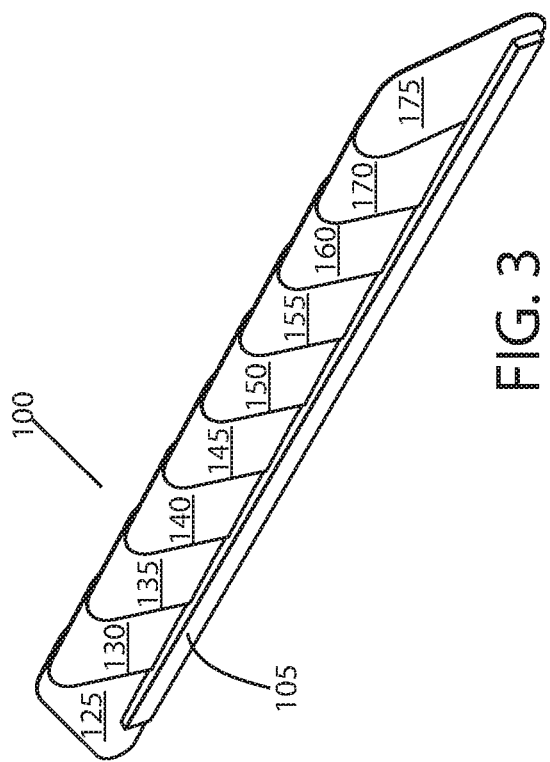
FIG. 3 is a perspective view of an exemplary conformable mud flap assembly according to principles of the invention.
Figure 4:
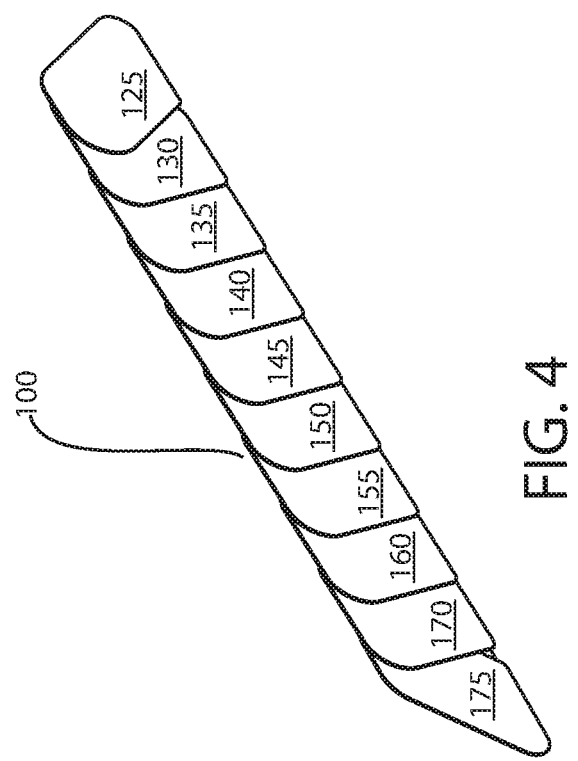
FIG. 4 is another perspective view of an exemplary conformable mud flap assembly according to principles of the invention.

In the perspective view of FIG. 3, the relationship between the spine 105 and scales 125-175 is more clearly visible. The exemplary spine 105 has provides an elongated structure to which an end of each scale 125-175 is attached. The spine 105 is durable and flexible. Flexibility allows the spine 105 to be bent in 3 dimensions to conform to the curvature and flare of a fender, particularly to the flange or edge of a fender.

The spine 105 is durable and flexible. It can be bent to conform to the shape of an engaged edge (i.e., flange or edge) of a fender. The spine 105 may be flexible at normal ambient temperatures, or may require heating from a blow dryer or heat gun to soften the material for bending. The spine 105 is preferably comprised of a plastic, rubber or plastic and rubber mix. To enhance flexibility and reduce brittleness, a plasticizer, e.g., a solvent, may be added to the resin or compound during manufacture (e.g., molding or extrusion). Other materials from which the spine may be formed include composites and bendable metals.

Scales 125-175 are attached to the spine 105 by adhesives, chemical bonding, or ultrasonic welding. However, other attachment means, such as integral formation, mechanical fasteners (e.g., snap-fit couplings, screws, nuts and bolts, rivets, clips or clamps) may be used to secure scales 125-175 to the spine 105.

Figure 5:
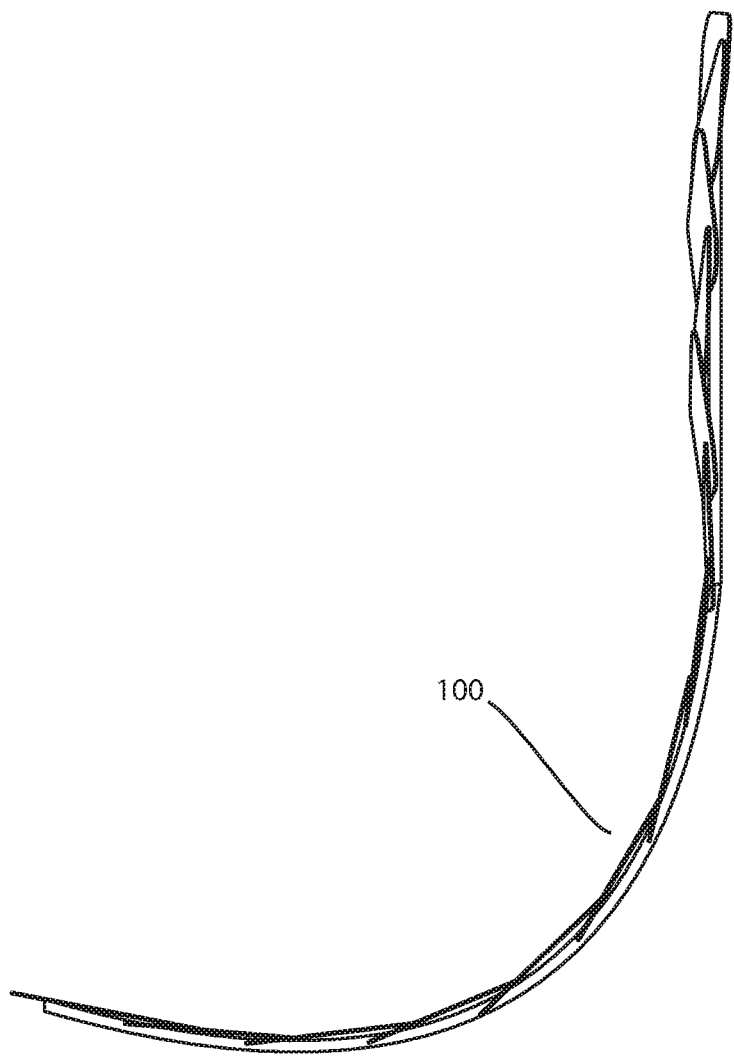
FIG. 5 is a profile view of an exemplary conformable mud flap assembly in a bent configuration according to principles of the invention.
Figure 6:
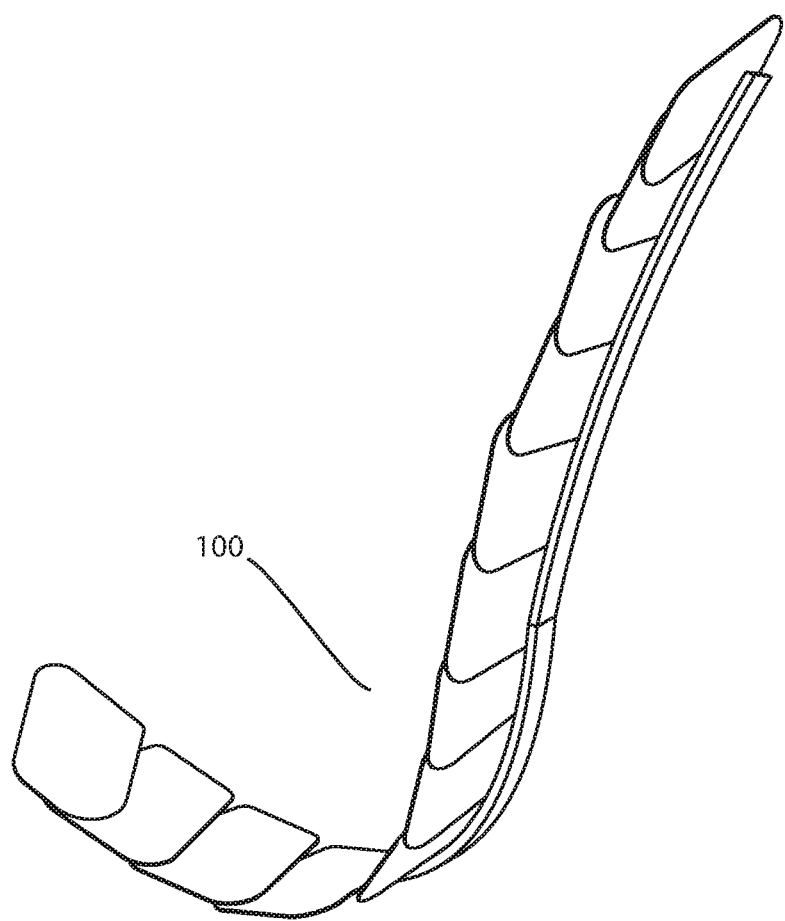
FIG. 6 is a perspective view of an exemplary conformable mud flap assembly in a bent configuration according to principles of the invention.
Figure 7:
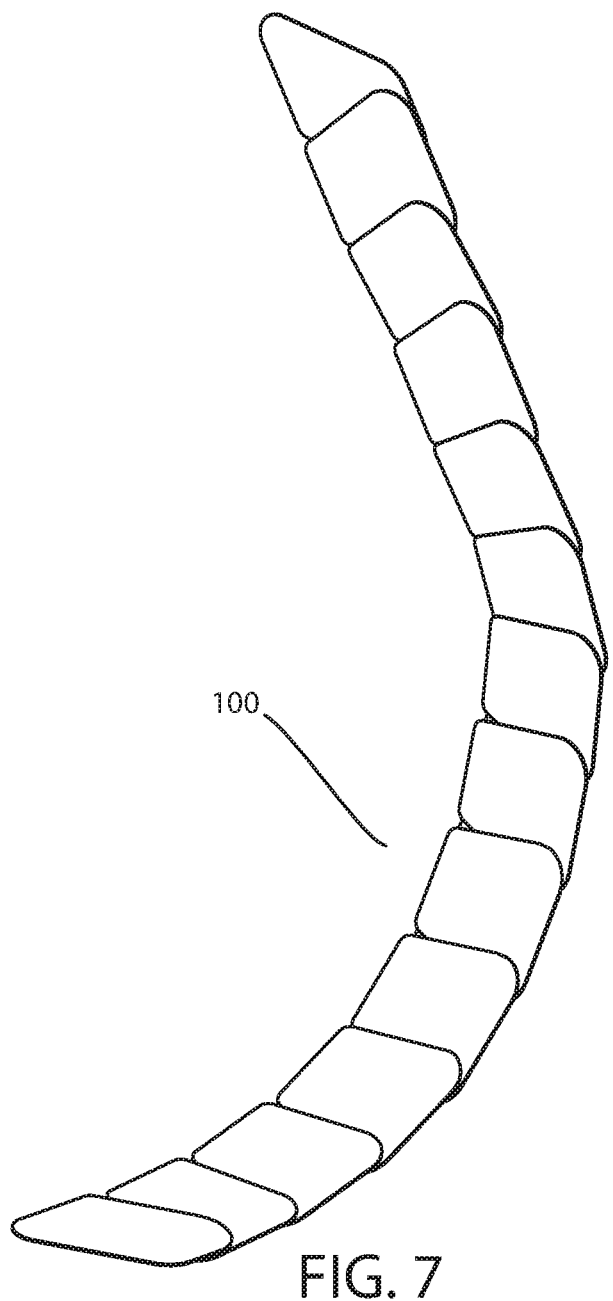
FIG. 7 is another perspective view of an exemplary conformable mud flap assembly in a bent configuration according to principles of the invention.

A conformable mud flap assembly 100 according to principles of the invention can be bent into any curved form, including complex 3D curves, to conform to curved and flared fenders. FIGS. 5, 6 and 7 conceptually illustrate the flexibility of the assembly 100. The flexibility allows it to conform to virtually any fender. In the case of a metal spine 105, the spine is malleable (i.e., capable of being bent manually). FIG. 5 shows, in 2 dimensions, bending into a curve. The perspective views of FIGS. 6 and 7, respectively, show, in three dimensions, bending into a complex curve.

Figure 8:
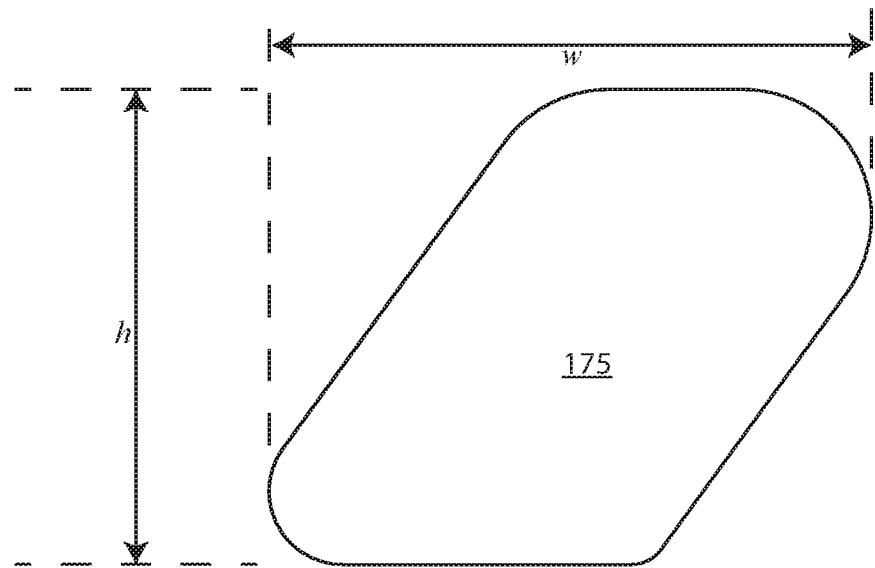
FIG. 8 is a view of a scale of the exemplary conformable mud flap assembly of FIG. 1 according to principles of the invention.
Figure 9:
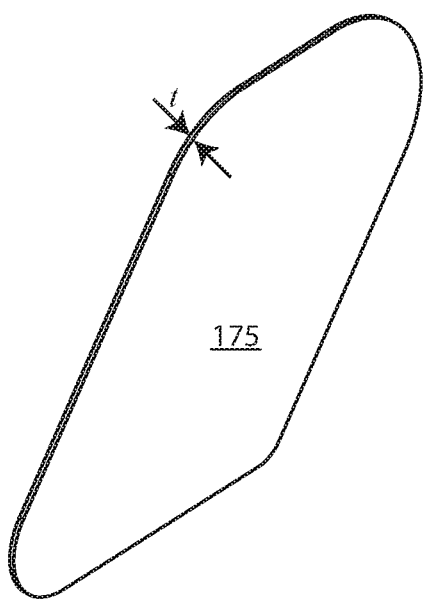
FIG. 9 is a perspective view of the scale of FIG. 8 according to principles of the invention.

For exemplary purposes and not limitation, a scale 175 for a conformable mud flap assembly 100 according to principles of the invention is illustrated in FIGS. 8 and 9. The exemplary scale is generally a parallelogram, i.e., a quadrilateral with two pairs of parallel sides. The corners are curved or filleted. The height, h, is sufficient to protect a surface from which the scale extends The height, h, may be less than an inch (e.g., 0.10, 0.50 or 0.75 inches), an inch (i.e., 1.0 inches), or more (e.g., about 1.1 to 3 inches). Heights between 1 inch and 2 inches are preferred, as they are sufficient for protection, yet inconspicuous, and compact enough to avoid scraping nearby obstacles. The invention is not limited to scales of any particular height.

The width, w, is sufficient for edges of immediately adjacent scales 125-175 to overlap, even when the spine 105 is bent to conform to a fender. The scales 125-175 are spaced and used in numbers to provide such overlapping edges for the entire length of the mudflap assembly 100. The narrower the width, the greater the number of scales for a given length of the mud flap assembly. Widths of about 0.75 to 2 inches work well. As scale geometries may have a width that varies according to height (e.g., width at tip less than width at base), the width referenced above is the maximum width for the scale geometry. However, the invention is not limited to any particular width (or any particular maximum width) or number of scales per given length of the assembly.

The thickness, t, is sufficient to withstand repeated impacts from debris propelled by tires. A thickness of $\frac{1}{16}$ to $\frac{3}{8}$-inch is sufficient for most scale materials. However, the invention is not limited to any particular scale thickness.

Figure 10:
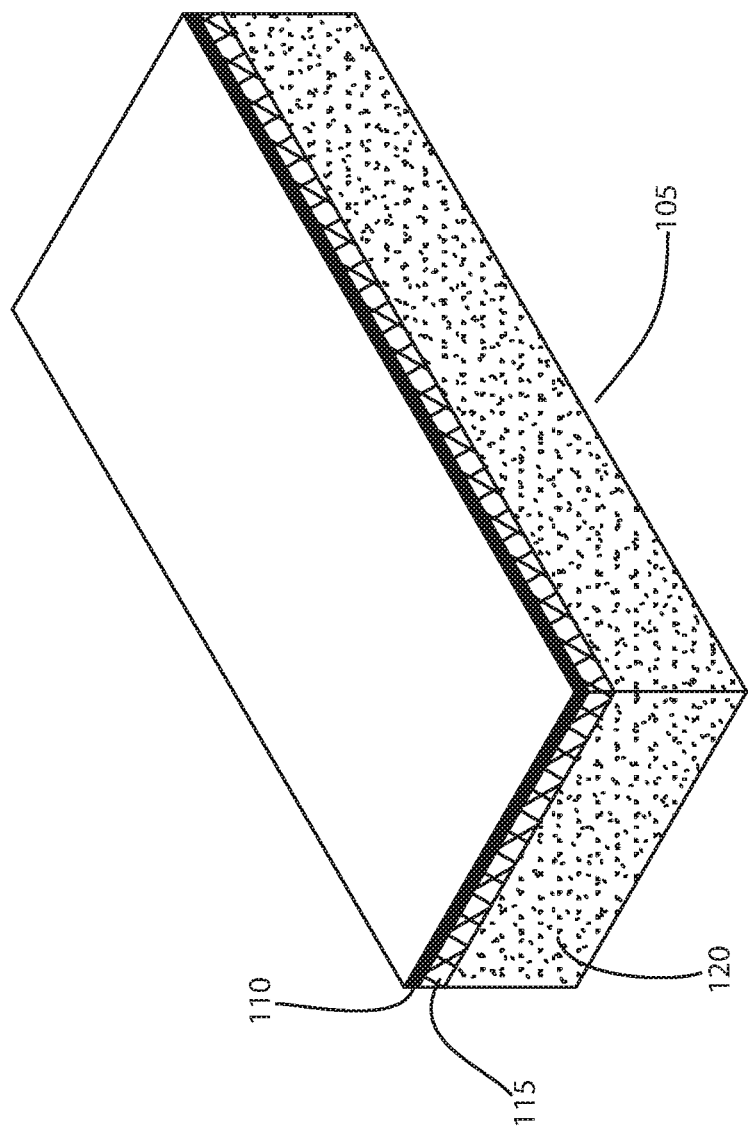
FIG. 10 is a perspective view of a segment of a spline for the exemplary conformable mud flap assembly of FIG. 1 according to principles of the invention.

FIG. 10 conceptually illustrates a segment of an exemplary spine 105. The spine includes a base or substrate 120, to which the scales 125-175 are attached. The substrate 120 is comprised of the flexible and/or malleable material described above. The intermediate layer 115 is a pressure sensitive adhesive. A removable backing 110 is provided over the pressure sensitive adhesive 115. The pressure sensitive adhesive 115 forms a bond when pressure is applied to marry the adhesive with an adherend. In some applications, solvent, water, or heat may be needed to activate the adhesive. While any pressure sensitive adhesive useful for bonding to metal and plastic surfaces, including painted surfaces, may be used, adhesives with a butyl rubber elastomer and compatible tackifier are preferred. The removable backing 110 peels away to expose the pressure sensitive adhesive 115 for bonding. The peeled away removable backing 110 may be discarded. When installed, the pressure sensitive adhesive 115 bonds the spine 105 to a flange or edge of a fender of a motor vehicle.

Adhesive strips which can be cleanly removed from a surface by stretching the strip are known in the patented prior art. U.S. Pat. No. 4,024,312, for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface. German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

In one embodiment, the adhesive 115 is a stretch releasing adhesive (e.g., a stretch releasing adhesive tape). The stretch releasing adhesive tape can be any pressure-sensitive adhesive tape that can be adhered firmly to a substrate and thereafter removed therefrom by stretching. Such pressure sensitive adhesive tapes can include an elastic backing, a highly extensible and substantially inelastic backing, or can be a tape formed of a solid, elastic pressure sensitive adhesive. Suitable stretch releasing tapes are described in U.S. Pat. No. 4,024,312 (Korpman), German Patent No. 33 31 016, U.S. Pat. No. 5,516,581 (Kreckel et al.), and PCT International Publication No. WO 95/06691 (Bries et al). In addition, the stretch releasing adhesive tape can include a splittable layer such as the layers described in PCT International Publication No. WO 98/21285, or a re-fastenable layer such as the layers described in PCT International Publication No. WO 99/31193. In each case, scales may be tugged to stretch the tape and release the assembly from a fender or other part of a vehicle.

Figure 11:
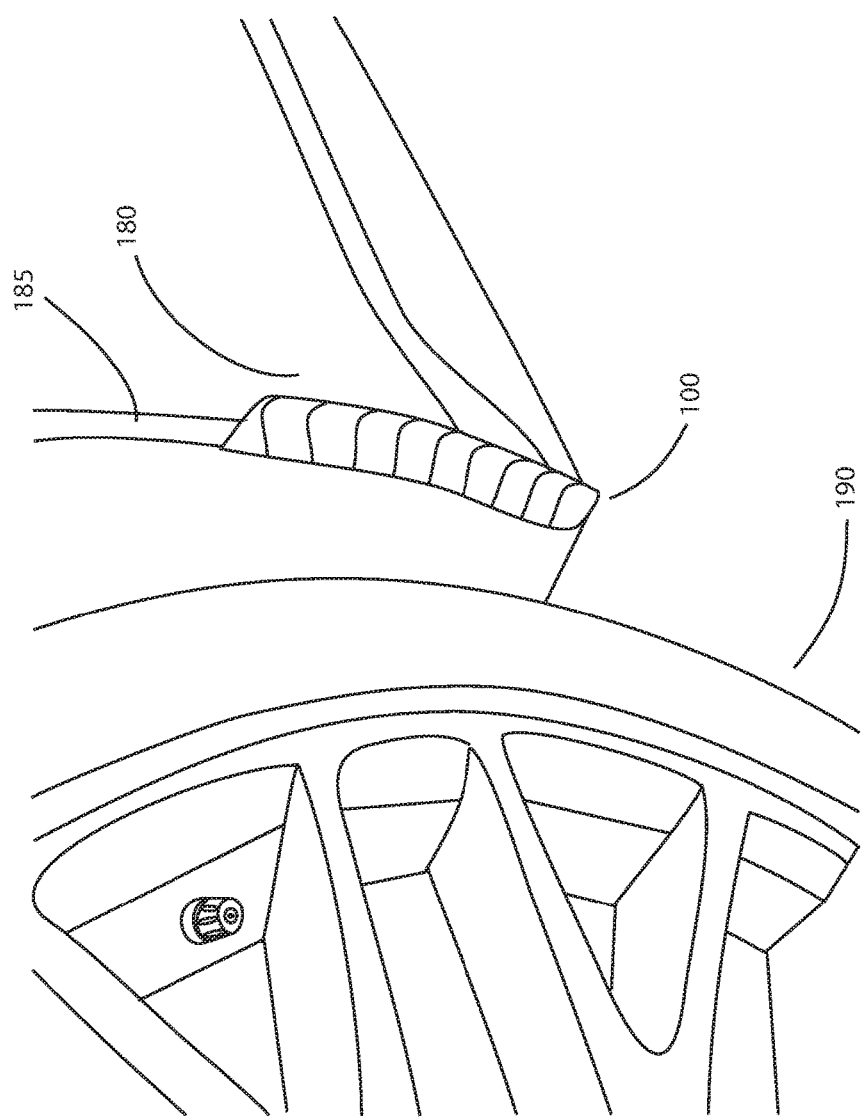
FIG. 11 is a first perspective view of the exemplary conformable mud flap assembly of FIG. 1 installed on a fender according to principles of the invention.

When installed on a fender 180, as illustrated in FIG. 11, the spine 105 is bound to the flange 185 of the fender 180 and the scales 125-175 extend outwardly from an engaged fender flange 185, following the contour of the fender 180. The outwardly extending scales 125-175 shield the body of the vehicle from debris propelled by the rotating tire 190. In FIG. 11, the mud flap assembly 100 is shown extending along the bottom rearward portion of the fender. Of course, a mud flap assembly 100 according to principles of the invention may extend further along the fender, along any portion of the fender, along a forward and/or rearward portion, and along the entirety of the fender at the wheel well.

While a mud flap assembly according to principles of the invention is described herein for use on fenders, such a device may also be used on other structures. By way of example and not limitation, such an assembly may be used as a window deflector and as a hood deflector. Indeed, an assembly according to principles of may be attached to various surfaces and edges of a vehicle to protect adjacent downstream or upstream features from debris.

Figure 12:
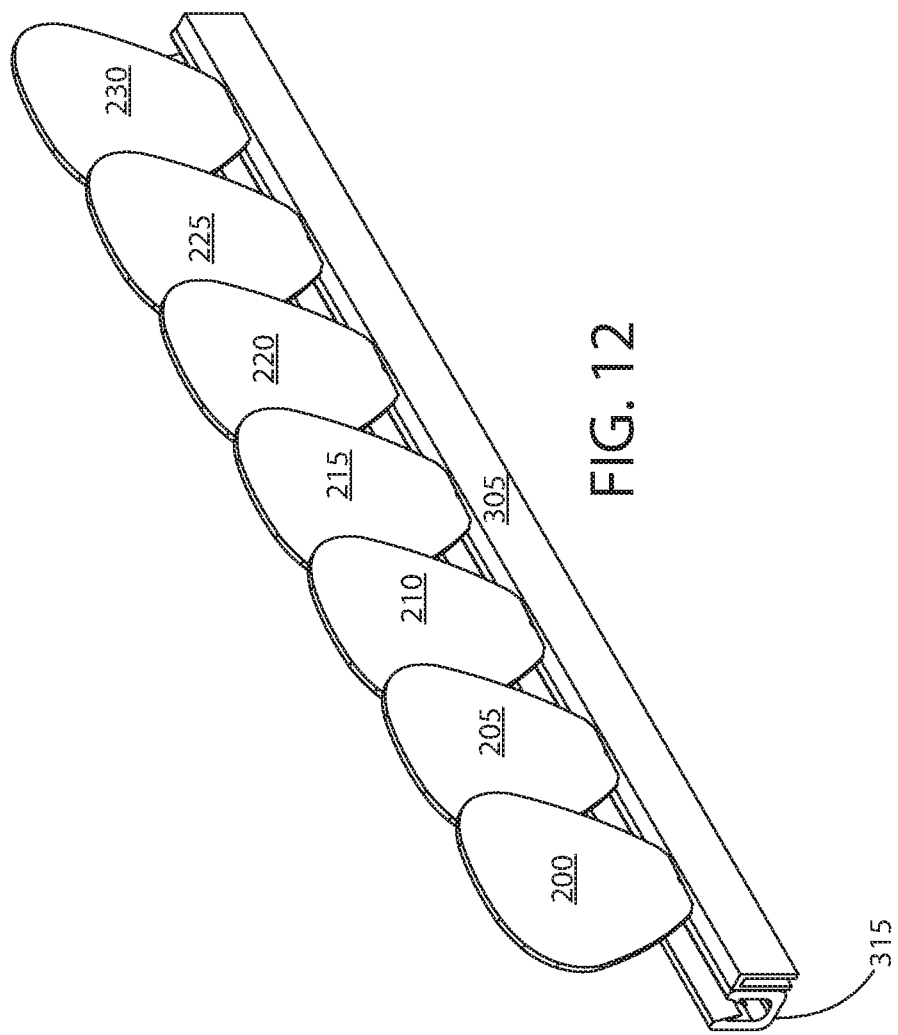
FIG. 12 is a perspective view of another exemplary conformable mud flap assembly according to principles of the invention.
Figure 16:
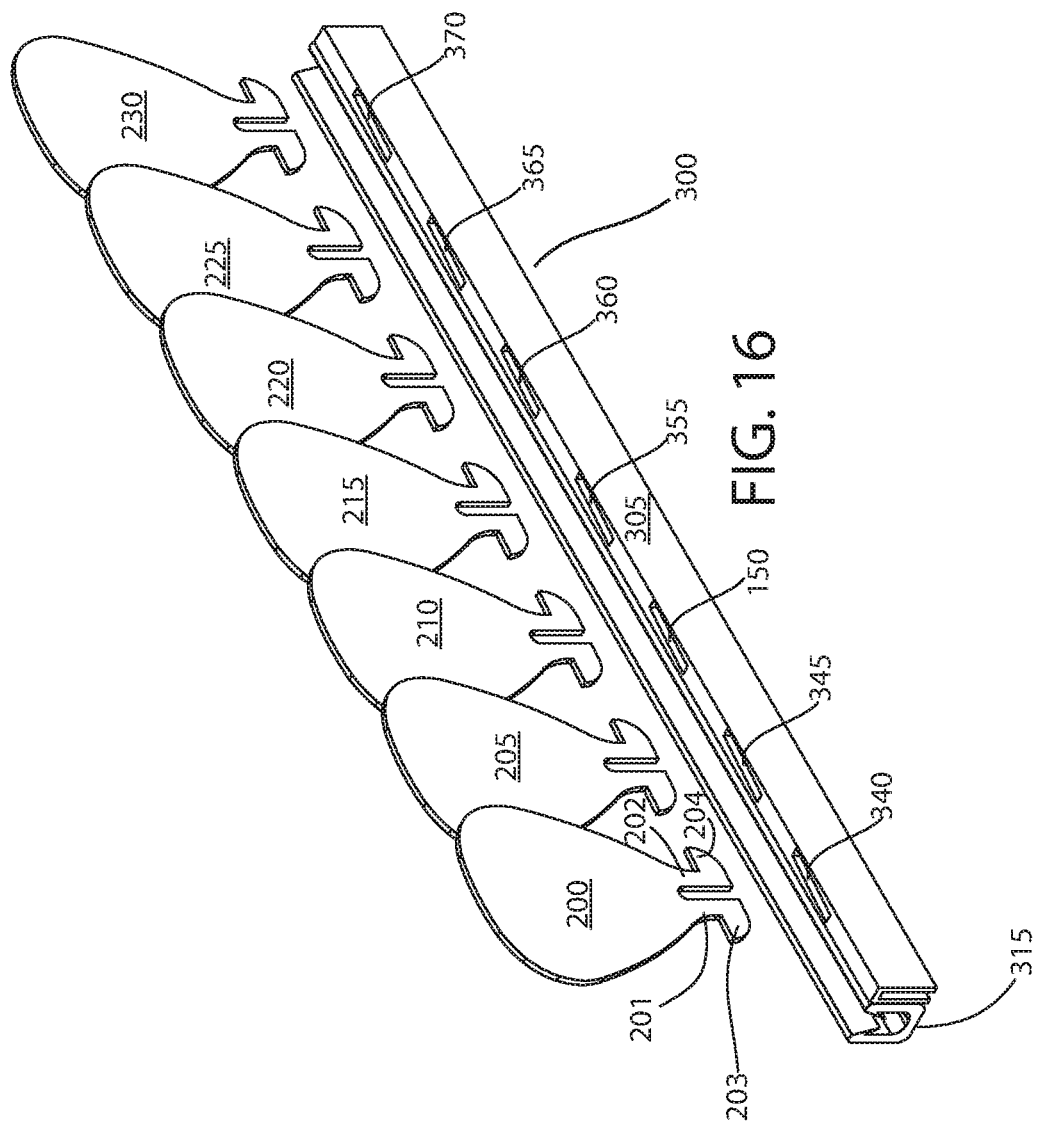
FIG. 16 is a partially exploded perspective view of an exemplary conformable mud flap assembly of FIG. 12 according to principles of the invention.

With reference to FIGS. 12 and 16, another exemplary conformable mud flap assembly 300 according to principles of the invention includes a flexible elongated spine 305 to which protective scales 200-230 are attached in an overlapping configuration, with overlapping portions of scales not being fixedly attached together. An attachment, such as an adhesive, magnets, or weatherstrip 315, is attached to the spine. In this embodiment, the attachment 315 is a strip having a U-shaped cross-section, which defines a compartment in which the flange of a fender may be securely received. The attachment 315 secures the spine to a fender of a vehicle. The scales 200-230 may be permanently attached to the spine or removably attached, such as with snap fit joints. The scales 200-230 may be plain or colorful, ornately decorated with graphics, images, textures and 2D and/or 3D features. The scales 200-230 may have a generally triangular shape with rounded corners as depicted in the Figures, or another shape, such as oval, irregular (e.g., character or logo shapes), symmetric or non-symmetric. The scales 200-230 should be sized to extend at least an inch, preferably more in height. The width of the scales 200-230 should be sufficient for the edges of immediately adjacent scales to overlap, even when the spine 305 is bent to conform to a fender. The spine 305 may be cut to length for a particular vehicle and a user's preferences.

Figure 13:
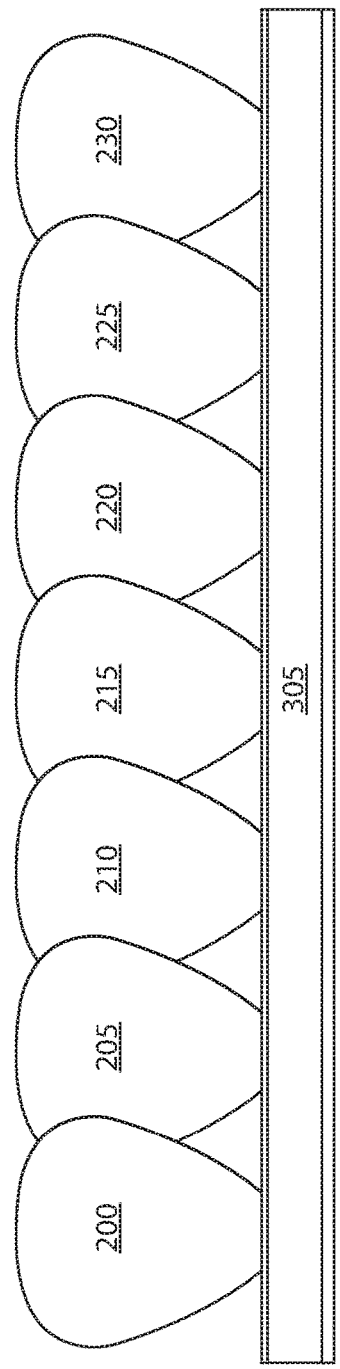
FIG. 13 is a view of the exemplary conformable mud flap assembly of FIG. 12 according to principles of the invention.

With reference to FIG. 13, the scales 200-230 are sized to extend a sufficient distance to protect a surface, which may be a height, h, less than an inch, an inch, or more (e.g., about 1.25 to 4 inches) in height (i.e., length). This embodiment of the invention is not limited to scales of any particular height.

The maximum width, measured from side edge to side edge, of the scales 200-230 should be sufficient for edges of immediately adjacent scales 200-230 to overlap, even when the spine 305 is bent to conform to a fender. Widths of at least about 0.75 to 2 inches work well. The scales 200-230 are spaced and used in numbers to provide such overlapping edges for the entire length of the mudflap assembly 300.

An exemplary assembly 300 according to principles of the invention includes sufficient scales to provide a barricade. The invention is not limited to any particular number of scales. The number will depend upon the size (length) of the assembly and the size of the scales.

As with the embodiment 100 described above, the scales 200-230 may be formed of any durable sheet-like material, such as metal and/or plastic. In an exemplary implementation, the scales 200-230 are comprised of a rigid rubber, plastic or polymeric material, such as polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters. While many other materials may be used alone or in combination with the aforementioned materials and/or other materials, without departing from the scope of the present invention, preferably the material is corrosion and weather resistant, impact resistant, durable, easy to clean, produces an aesthetically pleasing product and is relatively inexpensive and easy to manufacture. The material may further include additives to provide desired properties such as desired colors, structural characteristics, glow-in-the dark properties and thermal reactivity (e.g., color changes according to heat).

Figure 14:
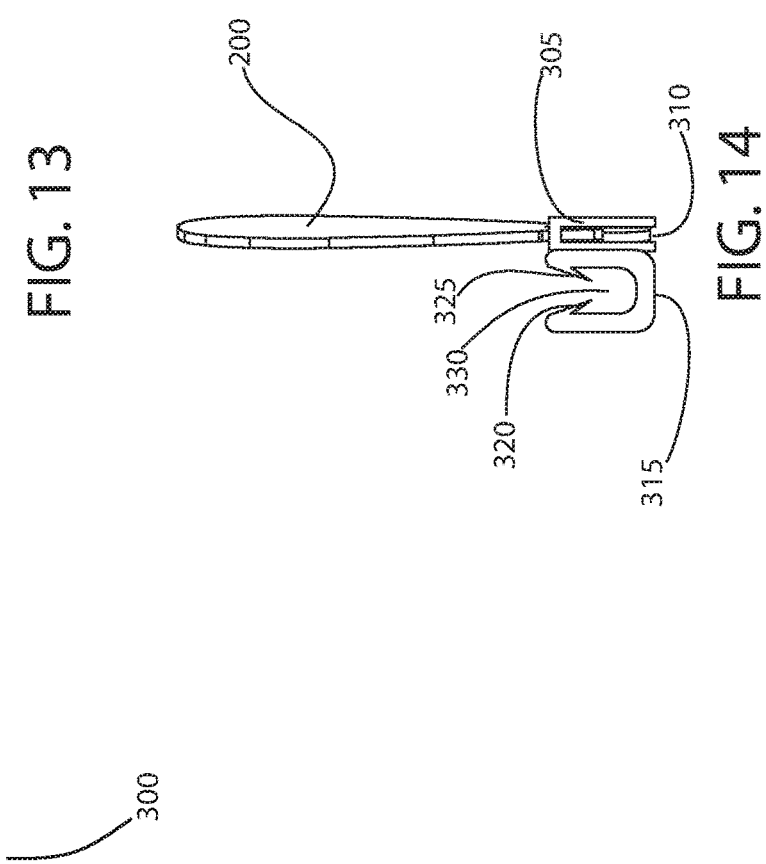
FIG. 14 is a profile view of an exemplary conformable mud flap assembly of FIG. 12 according to principles of the invention.
Figure 15:
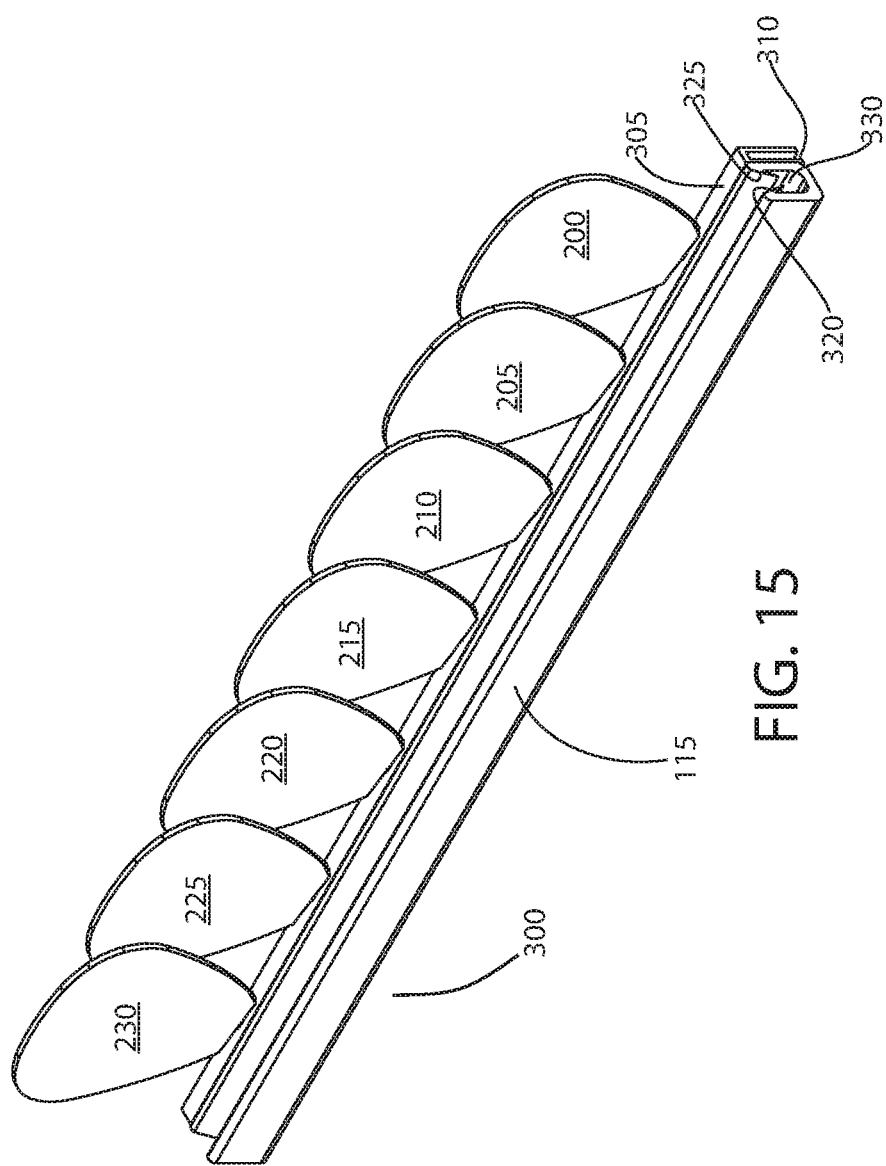
FIG. 15 is a perspective view of an exemplary conformable mud flap assembly of FIG. 12 according to principles of the invention.

In the profile and perspective views of FIGS. 14 and 15, the U-shape of the spine 305 and weatherstrip attachment 315 are more clearly visible. The exemplary spine 305 has a U-shape (i.e., upside down U-shape in the Figures) with slots in the horizontal segment for snap-fit insertion of the scales 200-230. The slots 1401-170 are more clearly visible in the exploded views of FIGS. 16 and 17. The open bottom 310 of the U-shaped spine 305 allows access to release snap-fitted scales 200-230.

The spine 305 is flexible. It can be bent to conform to the shape of an engaged edge of a fender. The spine may be flexible at normal ambient temperatures, or may require heating from a blow dryer or heat gun to soften the material for bending. The spine is preferably comprised of a plastic, rubber or plastic and rubber mix. To enhance flexibility and reduce brittleness, a plasticizer, e.g., a solvent, may be added to the resin or compound during manufacture (e.g., molding or extrusion). Other materials from which the spine may be formed include composites and bendable metals.

The exemplary weatherstrip attachment 315 is also U-shaped. An edge of a fender, or an edge of a flange of a fender, is securely received in the cavity 130 defined by the U-shape. The weatherstrip attachment 315 includes one or more inwardly extending fins 120, 125. The fins 120, 125 ensure a tight fit by pressing against the received edge of the flange or fender. The scales 200-235 extend outwardly and/or upwardly from the received edge of the fender 300, as conceptually illustrated in FIG. 20.

Like the spine 305, the weatherstrip 315 is flexible. It can be bent to conform to the shape of an engaged edge of a fender. The weatherstrip 315 may be flexible at normal ambient temperatures, or may require heating from a blow dryer or heat gun to soften the material for bending. The weatherstrip 315 is preferably comprised of a plastic, rubber or plastic and rubber mix. To enhance flexibility and reduce brittleness, a plasticizer, e.g., a solvent, may be added to the resin or compound during manufacture (e.g., molding or extrusion).

The invention is not limited to a weatherstrip attachment 315. Rather, other attachments, such as a pressure sensitive adhesive or strong magnets may be provide on the back of the spine 305 to secure the assembly to a fender of a vehicle. Mechanical attachments such as clamps, clips and screws (e.g., body panel screws) may also be used. As a nonlimiting example, the strip 305 may be screwed to existing holes in the flange of a fender. Such holes are used to secure protective plastic covers above the wheel in the wheel well. A longer screw may secure both the protective plastic cover and the mud flap assembly to the flange.

The exploded view of FIG. 16, reveals slots 140-170 into which flexible barbed cantilever prongs 201, 202 are inserted. During insertion, the prongs 201, 202 are urged together. Upon insertion, the prongs 201, 202 form a snap-fit coupling with the slots 140-170 of the spine 305, while the barbs 203, 204 resist inadvertent withdrawal. The scales may be removed by squeezing the barbs 203, 204 together while pulling the prongs out of the slot. As the bottom of the spine 305 is open, the barbs 203, 204 may be squeezed together using a tool, such as needle-nose pliers.

Attachments other than snap-fit couplings may be used to secure scales to the spine 305. Nonlimiting examples include adhesives, integral formation (e.g., molding), welding (e.g., ultrasonic welding), mechanical fasteners (e.g., screws, nuts and bolts or rivets), clips and clamps.

Figure 18:
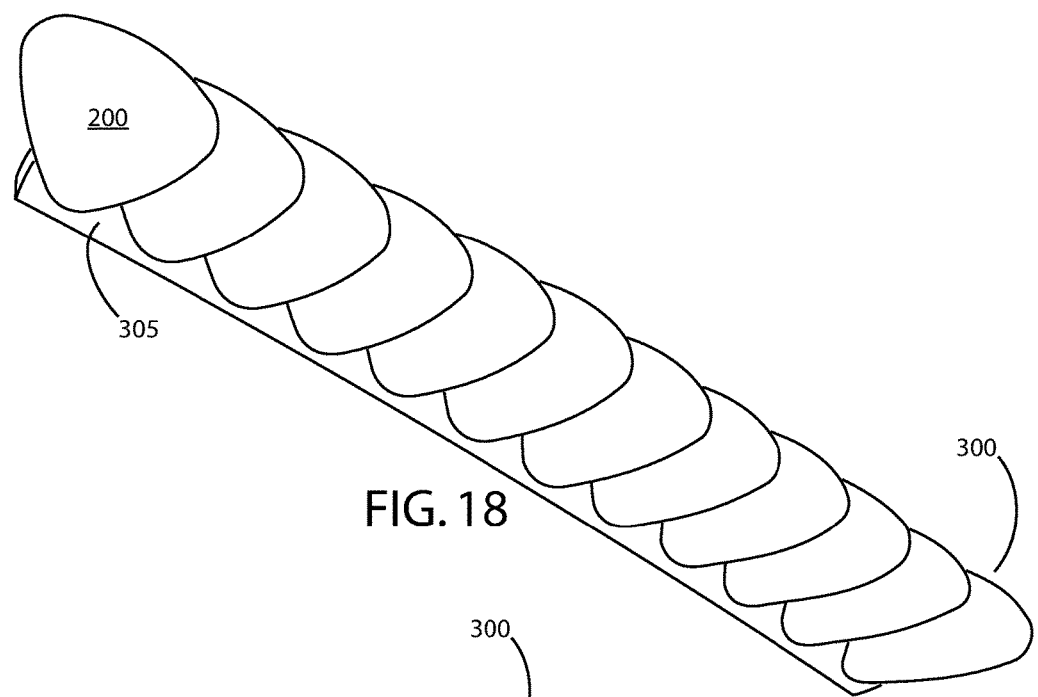
FIG. 18 is a perspective view of another exemplary conformable mud flap assembly of FIG. 12 according to principles of the invention.
Figure 19:
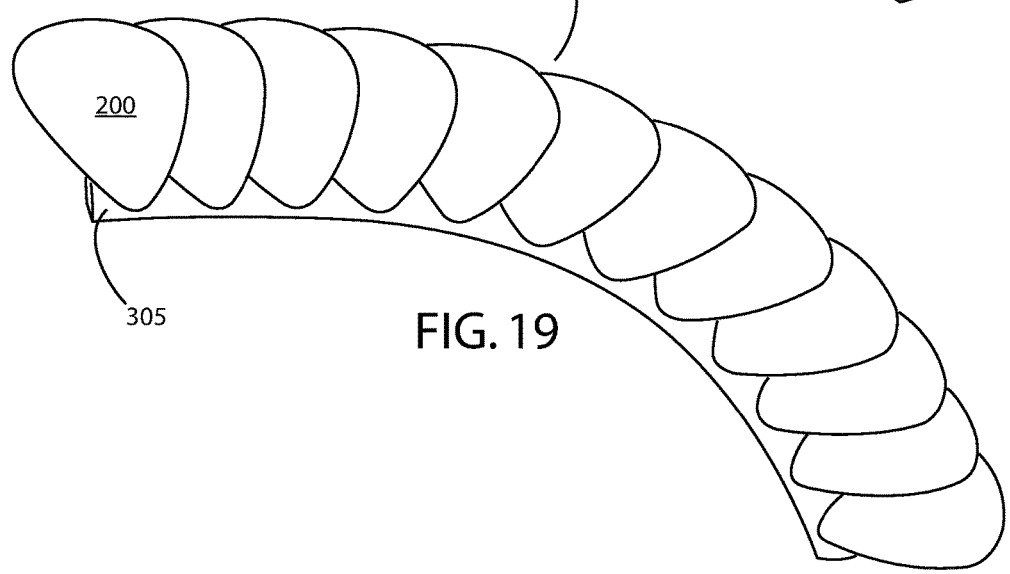
FIG. 19 is another perspective view of the exemplary conformable mud flap assembly of FIG. 12 in a bent configuration according to principles of the invention.

FIGS. 18 and 19 conceptually illustrate the flexibility of the assembly 300 that allows it to conform to virtually any fender. In particular, FIG. 19 provides a perspective view of the exemplary conformable mud flap assembly of FIG. 18 in a bent configuration according to principles of the invention.

Figure 17:
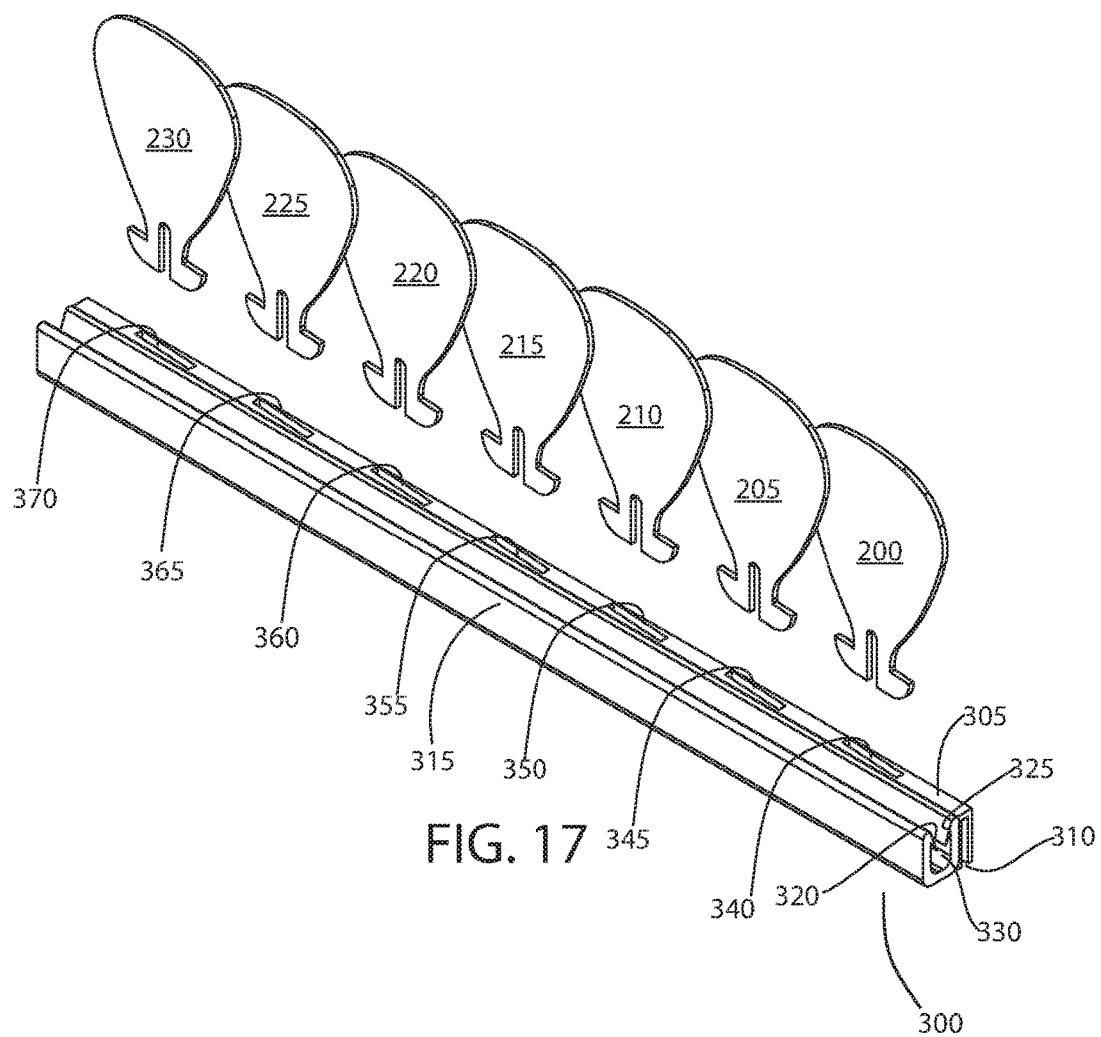
FIG. 17 is a partially exploded perspective view of an exemplary conformable mud flap assembly of FIG. 12 according to principles of the invention.
Figure 20:
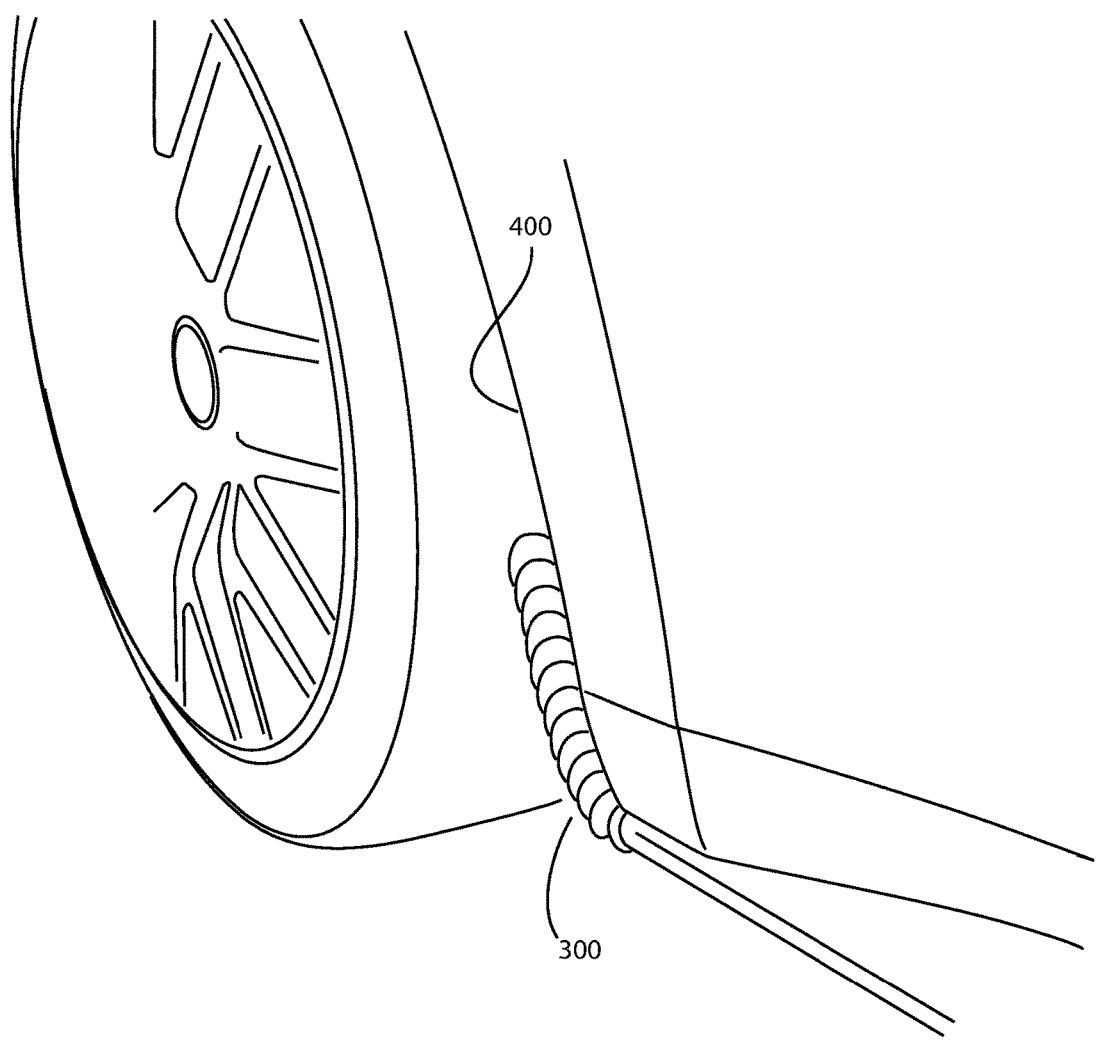
FIG. 20 is a perspective view of the exemplary conformable mud flap assembly of FIG. 12 installed on a fender according to principles of the invention.

When the assembly 300 is installed on a fender 400, as illustrated in FIG. 20, the scales extend outwardly from an engaged fender flange, following the contour of the fender. The outwardly extending scales shield the body of the vehicle from debris propelled by the rotating tire. In FIG. 17, the mud flap assembly 300 is shown extending along the bottom forward portion of the fender. Of course, a mud flap assembly 300 according to principles of the invention may extend further along the fender, along any portion of the fender, and along the entirety of the fender at the wheel well.

While a mud flap assembly according to principles of the invention is described herein for use on fenders, such a device may also be used on other structures. By way of example and not limitation, such an assembly may be used as a window deflector and as a hood deflector. Indeed, an assembly according to principles of may be attached to various surfaces and edges of a vehicle to protect adjacent downstream features from debris.

Figure 21A:
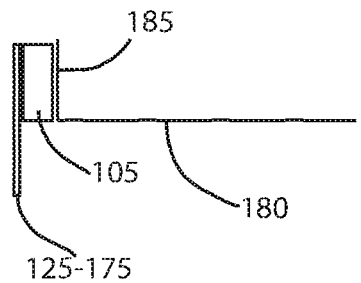
FIGS. 21A-21D are schematics that conceptually illustrate various embodiments of an exemplary conformable mud flap assembly installed on a fender according to principles of the invention.
Figure 21B:
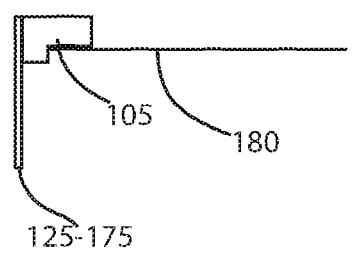
Figure 21C:
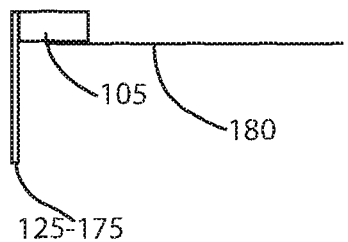
Figure 21D:
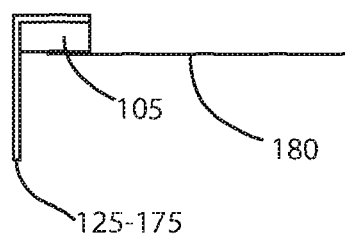

Some fenders may lack a flange or lack a substantial flange. In those cases, the spine may attach to an edge of or back side of the fender, and the scales may extend orthogonally to the attached surface of the spine. Alternatively, in those cases, the spine may be bent into a right angle, with the scales extending from one leg of the right angle, and the attachment applied to the other leg of the right angle. As another alternative, the spine may be malleable so that it can be bent into the right angle configuration. As yet another alternative, the spine and scales may be bent and/or malleable so that they can be bent or folded into the right angle configuration. FIGS. 21A-21D provide schematics that conceptually illustrate an assembly with a spine 105 attached to a flange 185 of a fender 180 (FIG. 21A), with the spine 105 bent, folded or formed into a right angle with a leg attached to the edge of the fender 180 and the scales 125-175 attached to an orthogonal leg of the spine 105 (FIG. 21B), with the spine 105 having a rectangular cross section and a surface attached to the edge of the fender 180 with the scales 125-175 extending from an orthogonal surface (FIG. 21C), and with the scales 125-175 bent or folded (FIG. 21D).

To facilitate bending, a fold line may be formed in the spine, and/or in the scales. A fold line is a weakened line provided in the material for the purpose of facilitating a folding of the spinel about the weakened line. The fold line may be a score line formed with a blunt scoring knife which creates a crushed portion in the material along the desired line of weakness. The fold line may also be a weakened lines formed as a combination of parallel score lines. The fold line may be any line of weakness formed in the material by any process for the purpose of facilitating a folding of the material about the line of weakness. The term "line" as used herein includes not only linear lines, but also other types of lines as well, e.g., curved, curvilinear or angularly displaced lines.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A conformable mudflap for adapting to the shape of and attaching to a fender structure, the conformable mudflap comprising:
   a spine comprising an elongated strip, the elongated strip being flexible in three dimensions,
   an attachment on the spine, the attachment being adapted to attach the spine directly to a fender structure;
   a plurality of scales, each scale of the plurality of scales having a first end and a second end opposite the first end, the first end of each scale being directly attached to the spine, the plurality of scales being attached to the spine in a spaced apart array, each scale of the plurality of scales partially overlapping an adjacent scale of the plurality of scales, and each scale extending outwardly from the spine at least 0.1 inches, and the second end of each spine being free and extending outwardly from the spine.

2. A conformable mudflap according to claim 1, the flexible spine being comprised of a flexible strip from the group consisting of plastic, rubber, and a mixture of plastic and rubber.

3. A conformable mudflap according to claim 2, each scale of the plurality of scales being comprised of a material from the group consisting of plastic, rubber, and a mixture of plastic and rubber.

4. A conformable mudflap according to claim 2, each scale of the plurality of scales being comprised of a metal.

5. A conformable mudflap according to claim 2, each scale of the plurality of scales extending outwardly from the spine at least 0.5 inches and having a maximum width of at least 0.5 inches.

6. A conformable mudflap according to claim 5, the flexible spine comprising a flexible strip from the group consisting of plastic, rubber, and a mixture of plastic and rubber.

7. A conformable mudflap according to claim 6, the attachment comprising a pressure sensitive adhesive.

8. A conformable mudflap according to claim 6, the attachment comprising a U-shaped channel.

9. A conformable mudflap according to claim 6, the attachment comprising a mechanical fastener.

10. A conformable mudflap according to claim 1, the flexible spine being comprised of a malleable metal strip.

11. A conformable mudflap according to claim 1, the attachment comprising an adhesive.

12. A conformable mudflap according to claim 1, the attachment comprising a pressure sensitive adhesive.

13. A conformable mudflap according to claim 1, the attachment comprising a U-shaped channel.

14. A conformable mudflap according to claim 1, the attachment comprising a mechanical fastener.

15. A conformable mudflap according to claim 1, the attachment comprising a magnet.

16. A conformable mudflap according to claim 1, each scale of the plurality of scales being comprised of a material from the group consisting of plastic, rubber, and a mixture of plastic and rubber.

17. A conformable mudflap according to claim 1, each scale of the plurality of scales being comprised of a metal.

18. A conformable mudflap according to claim 1, each scale of the plurality of scales extending outwardly from the spine at least 0.5 inches and having a maximum width of at least 0.5 inches.

19. A vehicle fender equipped with a conformable mudflap, the vehicle fender including an engaged portion, and
the conformable mudflap including:
a spine comprising an elongated strip, the elongated strip being flexible in three dimensions,
an attachment on the spine, the attachment directly attaching the spine to the engaged portion of the fender, the spine being bent to conform to the engaged portion of the fender,
a plurality of scales, each scale of the plurality of scales having a first end and a second end opposite the first end, the first end of each scale being directly attached to the spine, the plurality of scales being attached to the spine in a spaced apart array, each scale of the plurality of scales partially overlapping an adjacent scale of the plurality of scales, and each scale extending outwardly from the spine and outwardly from the engaged portion of the fender, the second end of each spine being free and extending outwardly from the spine.

20. A motor vehicle equipped with a conformable deflector, the motor vehicle including an engaged portion, and
the conformable deflector including:
a spine comprising an elongated strip, the elongated strip being flexible in three dimensions,
an attachment on the spine, the attachment directly attaching the spine to the engaged portion of the motor vehicle, the spine being bent to conform to the engaged portion of the motor vehicle,
a plurality of scales, each scale of the plurality of scales having a first end and a second end opposite the first end, the first end of each scale being directly attached to the spine, the plurality of scales being attached to the spine in a spaced apart array, each scale of the plurality of scales partially overlapping an adjacent scale of the plurality of scales, and each scale extending outwardly from the spine and outwardly from the engaged portion of the motor vehicle, the second end of each spine being free and extending outwardly from the spine.

* * * * *